United States Patent [19]

Humke et al.

[11] 4,227,979
[45] Oct. 14, 1980

[54] RADIATION-CURABLE COATING COMPOSITIONS CONTAINING AMIDE ACRYLATE COMPOUNDS

[75] Inventors: Byron M. Humke, Glenshaw; Gerald W. Gruber, Sewickley; Rostyslaw Dowbenko, Gibsonia; Charles B. Friedlander, Glenshaw, all of Pa.

[73] Assignee: PPG Industries, Inc., Pittsburgh, Pa.

[21] Appl. No.: 839,686

[22] Filed: Oct. 5, 1977

[51] Int. Cl.$^2$ .................... C08F 2/50; C08F 20/36; C08L 33/14
[52] U.S. Cl. .................... 204/159.16; 204/159.12; 204/159.13; 204/159.15; 204/159.18; 204/159.23; 260/28.5 R; 260/32.8 R; 260/32.8 SB; 260/17 A; 260/22 CB; 260/23 EP; 260/23 AR; 260/33.4 R; 260/33.4 SB; 260/33.65 B; 428/447; 260/33.66 A; 428/522; 526/304; 526/305; 560/221; 560/222
[58] Field of Search ............ 526/304; 260/836, 837 R, 260/858; 560/222; 204/159.23, 159.18, 159.15, 156.16

[56] References Cited

U.S. PATENT DOCUMENTS

| | | | |
|---|---|---|---|
| 3,170,901 | 2/1965 | Elkins et al. | 260/89.7 |
| 3,470,079 | 9/1969 | D'Alelio | 204/159.15 |
| 3,471,386 | 10/1969 | D'Alelio | 204/159.15 |
| 3,483,104 | 12/1969 | D'Alelio | 204/159.15 |
| 3,483,105 | 12/1969 | D'Alelio | 204/159.15 |
| 3,706,564 | 12/1972 | Hollister et al. | 96/114 |
| 3,860,563 | 1/1975 | Katsimbas et al. | 526/304 X |
| 4,000,358 | 12/1976 | D'Alelio | 526/292 |
| 4,001,304 | 1/1977 | Nyi et al. | 260/486 R |
| 4,076,691 | 2/1978 | Wichterle et al. | 560/221 |

FOREIGN PATENT DOCUMENTS

| | | |
|---|---|---|
| 49-18822 | 2/1974 | Japan . |
| 896511 | 5/1962 | United Kingdom . |
| 1012798 | 12/1965 | United Kingdom . |
| 1241472 | 8/1971 | United Kingdom . |
| 1241622 | 8/1971 | United Kingdom . |
| 1260609 | 1/1972 | United Kingdom . |
| 1277791 | 6/1972 | United Kingdom . |

*Primary Examiner*—Walter C. Danison
*Attorney, Agent, or Firm*—George D. Morris

[57] ABSTRACT

Radiation-curable coating compositions are disclosed which contain one or more amide acrylate compounds of the general formula:

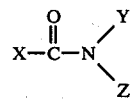

wherein X, Y and Z may each independently be H, alkyl, aryl, acrylyloxyalkyl, acrylyloxy aliphatic ester or acrylyloxy aliphatic ether, provided that X, Y and Z together have two, three or four acrylyloxy groups. The compositions are highly radiation-sensitive and very fast curing and form mar-resistant protective and decorative film coatings which are particularly useful as UV-cured overprint varnishes.

30 Claims, No Drawings

RADIATION-CURABLE COATING COMPOSITIONS CONTAINING AMIDE ACRYLATE COMPOUNDS

This invention relates to a class of fast curing coating compositions containing highly radiation-sensitive compounds known generally as amide acrylates. Coating compositions comprising a member of this class of compounds polymerize at an exceptionally high rate when exposed to ionizing radiation or to actinic light to form mar-resistant protective and decorative films. The high rate of film curing upon exposure to actinic light is not significantly inhibited by the presence of oxygen so that curing may be achieved under ambient atmospheric air conditions. Cured coatings may also be obtained by exposure of the compositions to ionizing radiation in the presence of oxygen, although not at the oxygen concentration found in the ambient atmosphere. Curing of amide acrylate containing compositions by ionizing radiation proceeds, however, in the presence of oxygen at concentrations several times higher than that previously known for curing of conventional acrylates. The formation of mar-resistant films at a high cure rate without the requirement of a substantially oxygen-free atmosphere, such as a nitrogen atmosphere, is of great economic advantage inasmuch as high production capacities can be obtained without prohibitively large capital investment. These compositions are particularly useful to form varnish coatings over paperboard packaging materials bearing printed indicia. This use requires low cost, fast curing coating compositions which exhibit the appropriate combination of flow, wetting and odor properties that will provide cured coatings having the high gloss, slip and transparency characteristics suitable for use in the paper coating industry.

A protective coating for a paper or paperboard substrate that bears printed indicia or pictorial matter must meet several rather stringent, and sometimes competing, physical and chemical criteria.

Firstly, the composition desirably has those rheological properties such that at the application of high shear stress the composition will flow readily, as for example, when a composition is applied to a substrate by a roll coater, or a printing press. Then, after transfer to the substrate, and in the absence of high shear stress, the composition must continue to flow for a few seconds to promote levelling of the coating to a uniform thickness. Good levelling performance, in turn, is a result of a balance of opposing forces, namely, forces deriving from the composition's viscosity, surface tension, elasticity and the force of gravity, each acting on the composition in a different manner as it spreads across a substrate. These particular properties must be balanced, however, against the ability of the composition to "wet" a substrate, especially one having letter printed indicia or heavily inked areas that typically impede the spreading and adhesion of a varnish coating onto a substrate.

Secondly, the composition must have those chemical properties which promote fast curing to a mar-resistant film while obtaining the highest gloss achievable. One requirement of an overprint varnish coating is that the composition be applied as a relatively thin layer, that is, in the range of 0.002 millimeter to 0.010 millimeter. These thinly applied compositions must cure very quickly on a paperboard substrate in order to meet cost performance requirements that dictate article processing speeds be limited only by the mechanical handling apparatus used in the UV processing industry. Surprisingly, it has been found that very thin varnish coatings cure at a slower rate than thicker coatings, especially when such coatings are applied over heavily inked substrates. One explanation of this phenomena is that the optical density of a thin film is such that considerable radiated energy passes through the film and is reflected back by a light-colored substrate, whereas a dark substrate absorbs the energy. The reflected energy apparently contributes to film cure. Thus, one chemical characteristic that a varnish coating composition should have is fast cure when applied as a thin film over a dark substrate.

Coating compositions which provide the aforementioned properties may be defined generally as radiation-polymerizable, highly-radiation sensitive compositions curable to form a film comprising one or more amide acrylate compounds having one nitrogen atom and being of the formula:

wherein X, Y and Z may each be independently selected from the group consisting of hydrogen and such functional groups as alkyl, aryl, acrylyloxyalkyl, acrylyloxy aliphatic ester formed by reaction of acrylating material with hydroxyl terminated aliphatic ester-containing intermediate resulting from the reaction of inner ester of hydroxy carboxylic acid and amino alcohol, and acrylyloxy aliphatic ether. It is intended that generally where the term "amide acrylate" is used such term embraces substituted derivatives of the acrylyloxy radical such as methacrylyloxy radical. A preferred compound for use in the radiation curable composition of the invention is bis(acrylyloxyethyl)formamide represented by the formula:

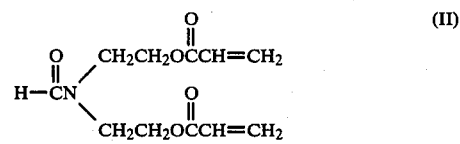

Another preferred compound is N,N-bis(2-acrylyloxyethyl)4-acrylyloxybutyramide represented by the formula:

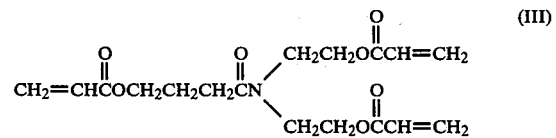

Other preferred acrylyloxy-containing compounds of the class generally described for use in the compositions include compounds represented by the following formulae:

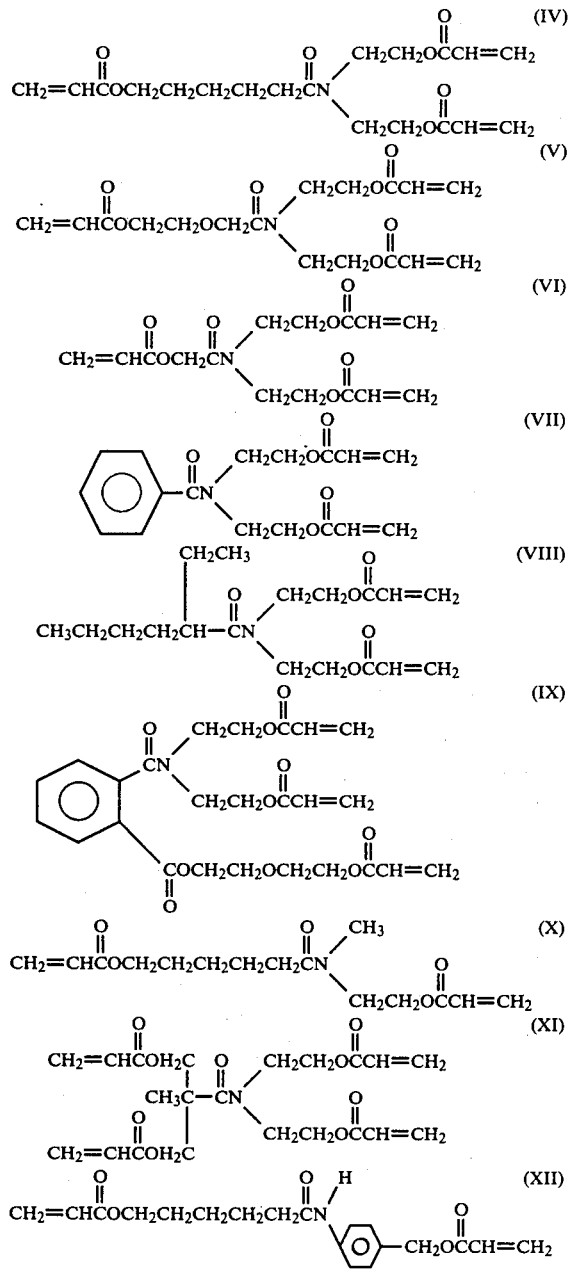

The amide acrylate compounds shown above may be formed by firstly reacting a compound selected from the group consisting of a carboxylic acid, an ester of a carboxylic acid, a hydroxy acid and an inner ester of a hydroxy carboxylic acid, with an aminoalcohol to form an amide-containing hydroxy group terminated intermediate. The intermediate is then reacted with a compound having acrylic functionality and having a functional group reactive with the hydroxy group of intermediate to form an acrylate-terminated amide-containing compound.

Suitable starting carboxylic acid compounds for making the amide-containing hydroxy terminated intermediate include formic acid, acetic acid, propionic acid, butyric acid, valeric acid, caproic acid, lauric acid, palmitic acid, stearic acid, oleic acid, benzoic acid, the ortho, meta and para isomers of toluic acid, phthalic acid and 2-ethylhexanoic acid. Especially preferred of these are formic, benzoic, and 2-ethylhexanoic acids.

Suitable also as a class of starting materials are the ester cognates of the aforementioned carboxylic acids. Especially preferred carboxylic acid esters include methyl formate and ethyl acetate.

A third class of useful starting materials comprises hydroxy acids. Preferred compounds of this class include α-hydroxy acids like glycolic acid. A preferred aromatic hydroxy acid is derived from the reaction of phthalic anhydride and diethylene glycol.

A fourth class of useful starting materials comprises inner esters of hydroxy carboxylic acids, such as γ-butyrolactone, γ-valerolactone, and ε-caprolactone.

Suitable aminoalcohol compounds for reaction with the aforementioned starting materials to form amide hydroxy containing intermediates include ethanolamine, diethanolamine, N-methylethanolamine, N-phenylethanolamine, 2-amino-1-butanol, 4-amino-1-butanol, 2-amino-2-ethyl-1,3-propanediol, 6-amino-1-hexanol, 2-amino-2-(hydroxymethyl)-1,3-propanediol, 2-amino-3-methyl-1-butanol, 3-amino-3-methyl-1-butanol, 2-amino-4-methyl-1-pentanol, 2-amino-2-methyl-1,3-propanediol, 2-amino-2-methyl-1-propanol, 5-amino-1-pentanol, 3-amino-1,2-propanediol, 1-amino-2-propanol, 3-amino-1-propanol, and hydroxyalkyl anilines like p-aminobenzyl alcohol.

The intermediate product formed from the aforementioned starting materials comprises one amide group and more than one reactive hydroxyl groups. This amide hydroxy containing product is reacted with a compound having acrylic functionality and having a functional group reactive with hydroxyl groups of the amide intermediate.

Suitable acrylating materials for reacting with the amide intermediate include compounds having acrylyl groups or α-substituted acrylyl groups such as methacrylyl, ethacrylyl and α-chloroacrylyl. These compounds must also contain functionality reactive with the amide intermediate hydroxyl group. Appropriate specific acrylating materials include acrylic acid, methacrylic acid, ethacrylic acid, α-chloroacrylic acid and acrylyl chloride, and mixtures of these materials. Preferred compounds are acrylic acid and methacrylic acid.

Amide acrylate compounds of the types described by the aforementioned general and specific formulae may be generally prepared by reacting together approximately equimolar amounts of a starting material selected from the designated classes with an aminoalcohol. The reactants when heated under refluxing conditions typically form an azeotropic boiling mixture. Volatile products formed by the reaction, such as water, ethanol, methanol, or others, depending upon the choice of reactants, may be collected and removed from the reaction mixture by conventional methods. The hydroxyl containing amide intermediate compound is then reacted with suitable acrylating materials to form the amide acrylyloxy containing compounds. It is generally preferred that an amount of acrylating compound be mixed with the intermediate which is stoichiometrically equivalent to the reactive hydroxyl group functionality of the intermediate, although an excess or deficiency of acrylating compound is not all harmful.

The amide acrylate monomers prepared as generally described are characterized as having one amide group and two, three or four acrylate functional groups per molecule, with a portion of the acrylate group providing an acryIyloxy radical. Amide diacrylate monomers are exemplified by Formulas II, VII, VIII, X and XII. Formulas III, IV, V, VI and IX represent amide triacrylates. An amide tetraacrylate is represented by Formula XI.

Specific examples describing preparation of several of the aforementioned amide acrylate compounds may be found in copending U.S. application Ser. No. 821,856, filed Aug. 4, 1977, which is incorporated herein by reference.

The described amide acrylate compounds are useful as radiation-curable components of film-forming coating compositions, wherein the compound may be present in an amount in the range of about one to 99 percent by weight of the composition. Usually, the amide acrylate concentration ranges from about 20 to about 80 percent. Where coating compositions of the invention are comprised of less than 99 percent amide acrylate compound, other acrylate compounds may constitute a portion of the monomers that may be copolymerized or interpolymerized with one or more of the amide acrylate compounds. Typically, other monomer components include alkyl acrylate compounds which may comprise the esterified or partially esterified reaction product of a lower alkyl polyhydric alcohol and acrylic acid or methacrylic acid. Examples of preferred lower alkyl polyhydric alcohols include ethylene glycol, diethylene glycol, triethylene glycol, propylene glycol, dipropylene glycol, hexane diol, glycerol, neopentyl glycol, pentaerythritol, trimethylolethane, trimethylolpropane and 2,2-dimethyl-3-hydroxypropyl 2,2-dimethyl-3-hydroxypropionate.

Epoxy acrylates may also be included as additional polymerizing components in the amide acrylate compositions. Useful epoxy acrylates include the reaction products of acrylic acid and methacrylic acid with alkyl or aryl polyfunctional epoxides. Typical alkyl epoxides include butane diol diglycidyl ether, neopentyl glycol diglycidyl ether, diethylene glycol diglycidyl ether and polyethylene glycol diglycidyl ether. Typical aryl polyfunctional epoxides include polyglycidyl ethers of polyphenols, such as bisphenol A diglycidyl ether. Other useful epoxy acrylates are disclosed in U.S. Pat. No. 3,874,906 to Prucnal et al.

Where mixtures of amide acrylate and alkyl or epoxy acrylate compounds are desired, the aforementioned hydroxy containing compounds may be reacted with an acrylating agent or with mixtures of acrylating agents at the same time the aforementioned hydroxy containing amide intermediates are acrylated. For example, trimethylolpropane may be reacted with acrylic acid to form a partially-acrylated or triacrylate monomer, depending on the amount of acrylic acid available and the relative reactivity of the hydroxyl functionality, at the same time bis(hydroxyethyl)formamide is acrylated to form the compound of Formula II. This mixture of acrylates may then be exposed to curing conditions to form interpolymerized acrylate polymer films. Also, mixtures of one or more amide acrylate compounds with one or more of the aforementioned alkyl or epoxy acrylate monomers may be utilized as the polymerizing component of a film forming composition. The predominant polymerizing component of the resin, however, consists of amide acrylate compound or a mixture of amide acrylate compounds.

There are distinct advantages provided by coating compositions having amide acrylate compounds of the type disclosed. Generally, these amide acrylate materials are of relatively low viscosity and thus impart to coating compositions the properties of ease of application, processing and handling. An additional advantage resides in the extremely fast cure exhibited by compositions having the aforementioned amide acrylate compound when the compositions are exposed to radiation. Fast cure, especially that promoted by UV radiation under ambient atmospheric conditions, is of significant advantage where the substrates to be coated are of paper or paperboard typically employed for packaging goods where cost of the packaging in relation to that of the goods must be small. Another desirable property exhibited by amide acrylate-containing coating compositions, especially of those compositions used for coating paper, is the improved flexibility of the cured film coating. Improved flexibility is an unexpected property of amide acrylate-containing coatings since compositions having amide functionality, commonly known as "hard segments", usually impart rigidity to film coatings.

Certain combinations of the aforementioned starting materials tend to form products that do not provide compositions that cure rapidly into mar-resistant films. For example, diamide acrylates are known to form rather poor films. Generally, monoamide acrylate monomers of the formulae above, especially those set forth in the examples of the aforementioned copending application Ser. No. 821,856, are quite suitable for fast curing coating compositions which form flexible, mar-resistant film coatings.

When one of the aforementioned alkyl or epoxy acrylate compounds are present in the composition, it can comprise a major or a minor component of the total amount of polymerizing component utilized in the coating composition, and thus may be present from about one to about 99 percent by weight of the composition. These alkyl and epoxy acrylate compounds are of relatively low cost and low color, and exhibit high chemical resistance and good thermal stability. Thus the compounds are useful in that they provide increased crosslink density to a cured film while, at the same time, imparting favorable properties to a cured coating without appreciably inhibiting the fast cure characteristics provided by the amide acrylate component.

Where coating compositions of the invention are comprised of less than 99 percent of amide acrylate monomer or mixtures of various amide acrylate monomers, or amide acrylate monomer mixed with the aforementioned alkyl or epoxy acrylate compounds, a copolymerizable reactive solvent selected from any of the conventional ethylenically unsaturated monomer materials that are radiation curable may comprise a major or minor component of the film-forming composition. General classes of such reactive functional monomer compounds include styrenes, vinyl amides, esters of vinyl alcohols, acrylate esters, maleate esters and fumarate esters. The amount of functional monomer in the composition can vary from about one to about 99 percent by weight of the composition. Usually, the amount of monomer will range from about one to 50 percent.

Also, substantially non-reactive volatile solvents may be present in the compositions in place of, or in addition to, the aforementioned reactive solvents. Examples of such volatile solvents include xylene, toluene, methyl chloride, 2-methoxyethanol, methyl isobutyl ketone and isopropyl alcohol. Any one or more of such solvents may be present in the composition in trace amounts to about 20 percent by weight of the amide acrylate component. Generally, these volatile solvents are utilized during preparation of the composition, but are removed substantially from the finished composition by solvent stripping processes described in the following examples.

Another constituent that may be present in the composition in minor amounts is a urethane-acrylate co-curing agent. These agents are typically derived from the step-wise reaction of three components, namely, a prepolymer moiety, an isocyanato-containing compound and a polyfunctional compound having both a functional group reactive with an isocyanato group and having ethylenic functionality. The prepolymer moiety is further characterized in having a molecular weight in the range of 300 to 3,000 and in having more than one reactive hydroxyl functional group.

Examples of suitable prepolymer moieties include polyester polyols, polyether polyols and poly(hydrocarbyl siloxane) compounds containing hydroxyl functional groups pendent to the siloxane backbone. A preferred family of polyester polyols of molecular weights of about 500 to about 1,300 is derived from the reaction of various polyglycols with $\epsilon$-caprolactone, such as those sold under the trade designation "NIAX" polyols by Union Carbide Corporation.

The isocyanato-containing compound may be selected from the broad classes of isocyanates having more than one isocyanato functional group, such as aliphatic polyisocyanates and aromatic polyisocyanates; bis(4-isocyanatocyclohexyl)methane is a particularly preferred isocyanato-containing compound.

The functional group of the polyfunctional compound which is reactive with an isocyanato group is typically a hydroxyl group. Examples of useful polyfunctional compounds to make the co-curing agent are acrylic acid and hydroxyl-containing acrylic ester; 2-hydroxyethyl acrylate is an especially preferred polyfunctional compound.

It has been found that some of these co-curing agents, particularly those prepared from a prepolymer moiety having a siloxane backbone, aid in the flow of varnish compositions. Furthermore, many of these compounds when co-cured with amide acrylate compound, or amide acrylate and alkyl acrylate or epoxy acrylate mixtures, impart "slip" to the cured film coating, while not inhibiting the speed of cure of the compositions.

A preferred co-curing agent having the aforementioned properties is a polysiloxane urethane acrylate compound derived from reacting a polydimethylsiloxane containing alcohol functional groups pendent to the siloxane backbone with a diisocyanate, such as isophorone diisocyanate, to form an intermediate that is then reacted with 2-hydroxyethyl acrylate to give an acrylate-functional urethane siloxane. Suitable useful polydimethylsiloxane starting materials include "silicone polycarbinols" sold by Dow-Corning under the trade designation "Silicone Q4-3557" and "Silicone DC 193".

The amount of co-curing agent present in the compositions may be generally in a range from about 0.1 to about 50 percent by weight of the composition and is usually present in a range from about 0.1 to about 20 percent.

Other materials that may be present in the composition include viscosity modifying agents to either increase or decrease the viscosity of compositions used for varnish coatings. Viscosity adjustment is necessary in some instances so that an even film of the composition, free of tears and discontinuities, may be applied to a substrate by conventional press or roller coaters. For example, dry lithographic press processes require relatively high viscosity varnish compositions, e.g., above 2,500 cps., for proper coating application. Gravure, or off-set gravure printing processes, on the other hand, require relatively low viscosity compositions, e.g., less than 2,500 cps. Examples of such viscosity modifying materials are cellulose acetate butyrate, carboxymethyl cellulose, microcrystalline cellulose, fumed silica, castor oil based compositions (e.g., Thixatrol ST; Baker Castor Oil Co.), 12-hydroxystearic acid, alkyd polymers, thermoplastic polymers of esters of acrylic and methacrylic acids, such as those esters sold under the trade designation "Acryloid" by Rohm & Haas Company, and modified clays. When used, these materials are usually present in an amount in the range of from about 0.5 percent to about 15 percent by weight of the composition.

One or more surface tension reducing agents may also be present in the composition. These agents in reducing the surface tension of the composition improve the ability of the composition to be applied to a substrate by a roller coater, without "hanging up" on the coater. Also, these agents improve levelling or flow of the composition across the substrate so that a void-free coating film of uniform thickness is formed. Preferred surface tension reducing agents include branched lower alkyl acrylate polymer materials such as poly(2-ethylhexylacrylate) ("Modaflow" flow agent of Rohm & Haas Company). Other such agents include fluorocarbons as a class and non-ionic alkyl ester surfactants, ethoxylated alkyl ester surfactants and ethoxylated phenol surfactants, such as those sold by Witco Chemical Corp. under the trade designation "900 Series Surfactants". When used, these surface tension reducing agents may be present in an amount in the range of about 0.1 to about 10 percent by weight of the composition.

Another component often found in the composition is a slip-aid agent which improves the aforementioned desirable slip characteristics of a cured film coating. Examples of slip-aid agents include fatty acids and fatty acid esters such as those sold by Witco Chemical Corp., and waxes comprised of esters of long chain monohydric alcohols and long chain fatty acids; the term "long chain" refers to a generally linear compound having 11 to 25 carbon atoms in the chain. Examples of these waxes include those esters formed from the reaction of fatty alcohols such as cetyl alcohol and stearyl alcohol, with fatty acids such as stearic acid, palmitic acid and myristic acid. Preferred waxes include those waxes comprising a mixture of cetyl palmitate and related fatty acid esters, of which spermaceti wax is an especially preferred example. When a slip-aid component is used in the composition, it is usually present in an amount in the range of about 0.01 to about 10 percent by weight of the composition.

The compositions of the invention may be cured as protective and decorative film-coatings in the presence of ionizing radiation or actinic light as hereinafter defined. When the coating composition is to be cured by exposure to ultraviolet light, a photocatalyst system comprising a photosensitizer, or a photopromoter, or a photoinitiator, or a mixture of two or all three of these components, is usually present.

Photoinitiators are compounds which absorb photons and thereby obtain energy to form radical pairs, at least one of which is available to initiate addition polymerization of acrylic or methacrylic groups in the well-known manner. Photosensitizers are compounds which are good absorbers of photons, but which are themselves poor photoinitiators. They absorb photons to produce excited molecules which then interact with a second compound to produce free radicals suitable for initiation of addition polymerization. The second compound may be a monomer, a polymer or an added initiator. Examples of photoinitiators are benzoin, methyl benzoin ether, butyl benzoin ether, isobutyl benzoin ether, α,α-diethoxyacetophenone, α,α-dimethoxy-α-phenylacetophenone, α-chloroacetophenone and methyl phenylglyoxylate. Examples of photosensitizers are benzil, 1-naphthaldehyde, anthraquinone, benzophenone, 3-methoxybenzophenone, benzaldehyde and anthrone. Photopromoters are compounds which do not absorb photons but improve the efficacy of photosensitizers and photoinitiators by acting as exceptionally good hydrogen donors. Amines, as a class, are good photopromoters, with specific classes of amines such as tertiary alkyl amines, tertiary alkanol amines and diamines including particularly good photopromoters.

The amount of photosensitizer, photopromoter, or photoinitiator, or mixtures of two or three of these compounds present in the radiation curable coating composition can vary widely. When any of these materials are present, the amount is usually in the range of from about 0.01 to about 20 percent by weight of the polymerizable compound of the coating composition. Most often the amount is in the range of from about 0.1 to about 5 percent. When the coating is to be cured by exposure to ionizing radiation, these materials are usually omitted from the coating composition, although their presence is permissible.

Extender pigments may be present in the composition, and when ultraviolet light is used to cure the film, it is preferred that the extender pigment be substantially transparent to ultraviolet light. Examples of ultraviolet light transparent extender pigments are silica, calcium carbonate, barium sulfate, talc, aluminum silicates, sodium aluminum silicates and potassium aluminum silicates.

Hiding and/or coloring pigments may optionally be present. When the pigment is of the ultraviolet light absorbing type and the coating composition is to be cured by exposure to ultraviolet light, the pigment should be used in amounts which do not preclude curing of the interior of the coating. Examples of hiding pigments are titanium dioxide, antimony oxide, zirconium oxide, zinc sulfide and lithopone. Examples of coloring pigments are iron oxides, cadmium sulfide, carbon black, phthalocyanine blue, phthalocyanine green, indanthrone blue, ultramarine blue, chromium oxide, burnt umber, benzidine yellow, toluidine red and aluminum powder. Individual pigments or mixtures of hiding and/or coloring pigments may be used.

Mixtures of extender pigments, hiding pigments and/or coloring pigments may also be employed.

Dyes in their customarily used amounts may be present in the coating composition.

The radiation curable coating compositions of the invention of the unpigmented or "clear" type are usually prepared by simply admixing the solution of polymerizable compound dissolved in reactive solvent with such other ingredients as may be present. Where pigmented compositions are desired, it may be necessary to use conventional high speed dispersing techniques such as used with Cowles, ball mill or sand mill mixing devices to disperse the pigment in the composition.

The radiation curable coating compositions are used to form cured adherent coatings on substrates. The substrate is coated with the coating composition using substantially any technique known to the art. These include spraying, curtain coating, dipping, direct roll coating, reverse roll coating, painting, brushing, printing, drawing and extrusion. The coated substrate is then exposed to radiation of sufficient intensity for a time sufficient to crosslink the coatings. The times of exposure to radiation and the intensity of the radiation to which the coating composition is exposed may vary greatly. Generally, the exposure to radiation should continue until hard, solvent resistant films result. In certain applications, however, it may be desirable for the curing to continue only until the gel stage has been obtained.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes, and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys. Especially suitable substrates are those of paper or paperboard bearing printed or decorative indicia over which a fast-curing protective transparent or pigmented film is formed from compositions containing amide acrylate of the invention. The compositions are also suitable as fillers for porous materials like wood and for topcoats for vinyl overlays and free vinyl overlays.

Cured coatings of the radiation curable coating composition usually have thicknesses in the range of from about 0.001 millimeter to about 3 millimeters. More often they have thicknesses in the range of from about 0.002 millimeter to about 0.3 millimeter, and most preferred are coatings ranging from 0.002 millimeter to 0.10 millimeter.

The coatings of this invention may be cured by exposure to ionizing radiation, the unit of dose of ionizing radiation being the "rad" which is equal to 100 ergs of energy absorbed from ionizing radiation per gram of material being irradiated. As used throughout the specification and claims, dose is referenced to the bleaching of calibrated blue cellophane film irrespective of the identity of the coating composition being irradiated.

The coatings of the invention may also be cured by exposure to actinic light. Actinic light, as used herein, is electromagnetic radiation having a wavelength of 700 nanometers or less which is capable of producing, either directly or indirectly, free radicals capable of initiating addition polymerization of the coating compositions of the invention. Usually photoinitiator, photosensitizer, photopromoter, or mixtures of these components, are present to absorb photons and produce the free radicals, although in some cases, these materials are not needed. Actinic light possesses insufficient energy to produce ions in a medium composed of common elements such as air or water and hence, has an energy below about 10 electron volts. The most commonly used form of actinic light is ultraviolet light, viz., electromagnetic radiation having a wavelength in the range of from about 180 nanometers to about 400 nanometers, although actinic light of greater or shorter wavelength may also be used effectively.

Any suitable source which emits ultraviolet light may be used in the practice of this invention. Suitable sources are set forth in U.S. Pat. No. 4,017,652 to Gerald W. Gruber.

The folowing examples, setting forth specific reactant quantities and conditions, specify certain additives, such as catalysts, diluents and surfactants for preparation of radiation polymerizable coating compositions of the present invention having amide acrylate compounds. Unless otherwise indicated, all parts and percentages are by weight, and all viscosity values are from measurements of undiluted samples on the Gardner-Holt viscosity scale. These embodiments are not to be construed, however, as limiting the invention since there are numerous variations and modifications possible.

EXAMPLE I

A reaction vessel is equipped with an agitator, a heater, cooling means, a thermometer and a condensing apparatus. The vessel is charged with 842 parts diethanolamine and 159 parts toluene. With the contents of the vessel at an initial temperature of about 33° C. and under constant agitation, 383 parts 97 percent formic acid is added to the vessel over a period of about 30 minutes, after which time the temperature is about 94° C. Heating is continued under reflux conditions for about three hours, during which time about 132 parts water of reaction is collected as the temperature rises to about 138° C. The reaction mixture is then cooled to about 66° C. over a period of 30 minutes. The vessel is then charged with 534 parts 1,1,1-trimethylol-propane, 1797 parts acrylic acid, 196 parts of 0.1 percent phenothiazine in toluene solution, 1.6 parts hydroquinone, 32 parts butylstannoic acid and 880 parts toluene. Heating is applied over a period of about one hour and 15 minutes to raise the temperature of the reaction mixture to about 110° C., at which temperature refluxing begins. Refluxing is continued for nine hours while the temperature of the reaction mixture gradually rises to 118° C., after which time 462 parts water is collected and an acid value of 38 is obtained for the reaction mixture (measured as milliequivalents of titrated KOH per gram of sample). The reaction product is then cooled to about 52° C., and discharged into a storage container.

Then 4600 parts of the reaction product is placed in a reaction vessel equipped with heating means, cooling means, a thermometer and a vacuum distillation apparatus. With the contents of the vessel at an initial temperature of about 37° C., a vacuum is established in the vessel measured as 37 millimeters mercury absolute pressure. Heating is applied over a period of one hour and 40 minutes, after which time the temperature rises to about 77° C., the vacuum increases to 38 millimeters, and 890 parts distillate, comprising mainly toluene, is collected. The reaction product is held under these conditions for an additional one hour and 20 minutes, after which time the vacuum is measured as 20 millimeters of mercury absolute pressure, the temperature is about 79° C. and a cumulative total of 947 parts distillate is collected. The reaction product is then cooled to about 52° C. and filtered through a 10 micron GAF filter bag into a storage container.

EXAMPLE II

A reaction vessel is equipped with an agitator, a heater, cooling means, a thermometer and a condensing apparatus designed for refluxing an azeotropic mixture, commonly known as a Dean-Stark trap. The vessel is charged with 544 parts of an intermediate reaction product prepared by the reaction of equimolar amounts of formic acid and diethanolamine, as generally set forth in Example I, together with 233 parts 1,1,1-trimethylolpropane, 785 parts glacial acrylic acid, 86 parts of a 0.1 percent solution of phenothiazine in toluene, 14 parts butylstannoic acid, 0.7 part hydroquinone and 386 parts toluene. The Dean-Stark trap is filled with toluene to aid in separation of the water component from the water-toluene azeotrope. With the apparatus set for maximum agitation and maximum azeotropic reflux, the reaction mixture is heated to about 107° C. in 20 minutes and then to about 110° C. in a subsequent one-hour heating period. Water of reaction, separated from the volatile azeotrope and collected in the Dean-Stark trap, amounts to about 32 parts after the initial one hour and 20 minute heating period. The reaction mixture is then heated for eight hours and 30 minutes at 110°–121° C., with care being taken that the temperature of the reaction mixture does not exceed 127° C. At the end of the heating period, approximately 168 parts water is collected from the reaction vessel. The reaction mixture is then cooled to 49°–52° C. and filtered through a nylon bag into a storage container.

An airtight reaction vessel equipped with an agitator, a heater, cooling means, a thermometer and vacuum distillation apparatus is charged with about 181 parts of the reaction product from the aforementioned storage container. With application of a vacuum to the reaction vessel measured as 20–23 millimeters of mercury absolute pressure, the reaction product is heated to about 77° C. in two hours and 30 minutes. Approximately 34 parts of distillate, comprising mainly toluene, is collected during this initial heating period. The reaction product is then heated an additional hour at about 80° C. under 18 millimeters of vacuum. The amount of distillate collected remains at about 34 parts thus indicating removal of most of the volatile solvent from the reaction product. The product is then cooled to about 52° C. and filtered through a 10 micron GAF filter into a storage container.

EXAMPLE III

A reaction vessel is equipped with an agitator, a heater, cooling means, a thermometer and a condensing apparatus. The vessel is charged with 104 parts ε-caprolactone and then under a nitrogen blanket the charge is heated to about 52° C. over a period of 30 minutes. Then over a period of 50 minutes 95 parts of preheated diethanolamine is gradually added to the first charge, with care being taken during the exothermic reaction so that reaction mixture does not exceed 57° C. The temperature of the reaction mixture is then increased to 60°–63° C. and maintained at that temperature for about two hours and 40 minutes. Then 17 parts more ε-caprolactone is added to the reaction mixture, with gradual heating over a period of one hour to raise the temperature to 68°–71° C. The reaction mixture is held at 68°–71° C. for four hours after which time a base value of 18.2 is obtained (expressed as milliequivalents of back-titrated KOH per gram of sample). The amide triol intermediate product is then cooled to room temperature.

Into another reaction vessel equipped as before and having a Dean-Stark trap for removing water from an azeotropic mixture, there is introduced 109 parts of the forementioned intermediate product together with 98 parts glacial acrylic acid, 2 parts butylstannoic acid, 0.013 part phenothiazine, 0.2 part hydroquinone and 39 parts toluene. The reaction mixture is then heated to about 114° C. in about 45 minutes at which time the apparatus is set for maximum agitation and maximum azeotropic reflux. For a period of approximately 10 hours, the reaction mixture is maintained at a temperature of 111°–126° C. during which time maximum reflux conditions are maintained. Approximately every hour during the reflux period, the acid value of the reaction mixture and the quantity of by-product water from the azeotropic distillation are measured. At the end of the reflux period, the acid value is 48.7 while approximately 19 parts water is collected. The reaction mixture is then cooled to about 52° C. before filtering through a 25 micron GAF filter into storage containers.

Approximately 227 parts of the unstripped resin-solvent mixture prepared above is placed in a vessel equipped with heating means and vacuum distillation apparatus. The mixture is heated while a vacuum is simultaneously established in the reaction vessel. The temperature is maintained at 77°–81° C. under vacuum conditions for about three and ¾ hours, after which time approximately 29 parts of volatile distillate is collected.

EXAMPLE IV

A reaction vessel is equipped with an agitator, a heater, cooling means, a thermometer and a condensing apparatus. The vessel is charged with 164 parts isophorone diisocyanate, 200 parts triethyleneglycol diacrylate and 0.4 part dibutyltin dilaurate catalyst. With the apparatus set for maximum agitation, heat is applied to raise the temperature of the reaction mixture to about 40° C. Then over a period of about two hours, 296 parts of a polydimethylsiloxane sold by Dow Corning under the trade designation "Silicone Q4-3557" is added to the vessel, during which time any exothermic reaction occurring is controlled by maintaining the temperature at 40°–42° C. Thereafter the mixture is heated to about 49° C. over a period of 15 minutes, and then is held at 49° C. for about 30 minutes. An air sparge is applied to the reaction mixture while a nitrogen blanket is established above the reaction mixture surface. Then over a period of 30 minutes, a mixture of 138 parts 2-hydroxyethyl acrylate and 1.5 parts di-t-butyl-p-cresol ("Ionol" inhibiting agent; Shell Oil Co.) is added to the vessel. Thereafter the reaction mixture is held at 49°–52° C. for about five hours, after which time a viscosity measurement of an undiluted sample of the reaction mixture is found to be "J" on the Gardner-Holdt scale. Then heat is applied to raise the temperature of the reaction mixture to about 60° C., with the temperature thereafter being held at 64°–71° C. for about four hours. A viscosity measurement is obtained as "R+". The reaction mixture is then cooled to about 49° C. and filtered through double layer nylon bags into a storage container.

EXAMPLE V

A reaction vessel is equipped with an agitator, a heater, cooling means, a thermometer and a condensing apparatus. The vessel is charged with 134 parts diethanolamine and then under a nitrogen blanket the charge is heated to about 67° C. over a period of about three hours. While maintaining the temperature of the reaction vessel at about 67° C., 115 parts γ-butyrolactone is gradually added to the first charge over a period of about one hour, with approximately 30 parts of the γ-butyrolactone being added each quarter hour. The reaction mixture is then held at 65°–68° C. for seven hours after which a viscosity of Y+ is achieved. The reaction product, identified as N,N-bis[2-hydroxyethyl-(γ-hydroxybutyramide)], is then cooled to about 52° C. and filtered through a nylon bag into a storage container.

Into another reaction vessel equipped as before and having a Dean-Stark trap, there is introduced 95 parts of the aforementioned reaction product together with 2 parts 97 percent formic acid. The reaction mixture is then agitated for 15 minutes. To the reaction vessel at a temperature of about 10° C. there are added 2 parts butylstannoic acid, 0.018 part phenothiazine, 0.95 part di-t-butyl-p-cresol ("Ionol" inhibiting agent; Shell Oil Co.), 0.068 part hydroquinone, 92 parts glacial acrylic acid and 29 parts toluene. The reaction mixture is then heated to about 121° C. in about 90 minutes at which time the apparatus is set for maximum agitation and maximum azeotropic reflux. For a period of approximately 12 hours, the reaction mixture is maintained at a temperature of 116°–139° C. during which time maximum reflux conditions are maintained. Approximately every 30 minutes during the reflux period, the acid value (measured as milliequivalents of titrated KOH per gram of sample) of the reaction mixture and the quantity of by-product water from the azeotropic distillation are measured. At the end of the reflux period, the acid value is 28.9 while approximately 22 parts water is collected. The reaction mixture is then cooled to about 52° C. before filtering through a 50 micron GAF filter into storage containers.

Approximately 195 parts of the unstripped resin-solvent mixture prepared above is placed in a vessel equipped with heating means and vacuum distillation apparatus. The mixture is heated while a vacuum is simultaneously established in the reaction vessel. The temperature is maintained at 60°–63° C. under vacuum conditions for about two hours, after which time approximately 18 parts of volatile distillate is collected. The resulting product is a light amber liquid of moderate viscosity.

EXAMPLE VI

Into a reaction vessel equipped with a thermometer, an agitator and heating means, there are charged 108 parts poly(2-ethylhexylacrylate) ("Modaflow" flow agent; Rohm & Haas Co.), 538 parts α,α-dimethoxy α-phenyl acetophenone ("Irgacure 651"; Ciba-Geigy), 246 parts benzophenone, 65 parts spermaceti wax and 943 parts isopropyl alcohol. The contents of the vessel are mixed and heated sufficiently to form a homogenous "pre-mix" solution.

Into two additional reaction vessels designated vessels "A" and "B" and equipped as before, there is charged into each vessel 1161 parts of amide acrylate reaction product prepared according to the procedures set forth in Example I, together with 1161 parts of amide acrylate reaction product prepared as in Example II, 995 parts of the amide acrylate reaction product prepared as in Example III, 86 parts of the silicon urethane acrylate reaction product prepared as in Example IV and 597 parts of the above prepared pre-mix solution. To vessel "A" only there is added 23 parts methyl phenylglyoxylate.

The viscosity of composition "A" is measured as 360 cps., while that of composition "B" is 380 cps., for samples tested at 25° C. with a No. 3 spindle at 12 rpm on a Brookfield LVF viscometer.

For a satisfactory cure-rate determination, samples of each composition are applied to the non-coated sections of #016 Morest paint penetration-opacity paperboard panels with a #003 wire-wound draw down bar. Samples are also applied to commercially available clay-coated paperboard used in the paper coating industry for evaluation of cured-coating physicals. The coated panels are exposed to a single 200 watt per inch mercury vapor lamp at a distance of 3½ inches above a conveyor carrying the panels at varying conveyor speeds.

Pertinent data relating to cure rates and physical characteristics are listed in Table I.

EXAMPLE VII

Into a reaction vessel equipped with heating means, agitating means and a thermometer, there is charged 713 parts of a reaction product, comprising chiefly amide acrylate and trimethylolpropane di- and triacrylate, prepared as generally described in Example I. With heat and agitation applied to the vessel contents, 37.5 parts cellulose acetate butyrate is added gradually to the reaction vessel so as to ensure the formation of a homogeneous solution.

Into a separate reaction vessel, there is charged 700 parts of the above prepared solution, together with 2,468 parts more of the reaction product as prepared generally in Example I, 35 parts benzophenone, 87.5 parts diethoxyacetophenone, 87.5 parts methyl phenylglyoxylate, 87.5 parts of the silicon urethane acrylate reaction product prepared as generally described in Example IV and 35 parts poly(2-ethylhexylacrylate). The reactants are mixed sufficiently to form a homogeneous blend. Then to 3,435 parts of this blend is added 177 parts methyl isobutyl ketone with mixing to ensure homogeneity.

Samples of the composition are applied as coating to paperboard substrates in the manner as set forth in Example VI, which coatings are cured under a 200 watt per inch mercury vapor lamp at a distance of 3½ inches, at conveyor speeds of 150 and 175 feet per minute. Pertinent data relating to cure and physical characteristics are listed in Table I.

EXAMPLE VIII

Into a reaction vessel equipped with agitating and heating means and a thermometer, there is charged 146 parts of a polysiloxane urethane acrylate prepared as generally described in Example IV, together with 40 parts diethoxyacetophenone, 20 parts of a fatty acid ester ("Witco 910"; Witco Chemical Corp.) and 400 parts of amide acrylate reaction product prepared as generally described in Example III. The reactants are heated to about 37° C. under constant agitation until a homogeneous blend is obtained. Then 50 parts of benzophenone is gradually added to the mixture, with mixing continued after addition to obtain homogeneity. With continuous mixing of the solution, 1,335 parts more of the amide acrylate reaction product, prepared generally as set forth in Example III, is added to the reaction vessel together with 8.8 parts of a fluorocarbon ("FC-430"; 3M Company).

Samples of the composition are applied to substrates and cured as set forth in Example VI. Physical evaluations are set out in Table I.

EXAMPLE IX

An alkyd is conventionally prepared from the condensation of 710 parts of a tall oil fatty acid and 782 parts phthalic anhydride with 482 parts glycerine in about 75 parts xylene solvent, or that amount of xylene sufficient to maintain an azeotrope-boiling mixture during the condensation reaction. To 400 parts of the alkyd reaction product at about 60° C., there is added 600 parts of a reaction product chiefly comprising amide acrylate and trimethylolpropane di- and tri-acrylate prepared as generally described in Example I. The components are mixed and allowed to cool.

To a reaction vessel equipped with heating and agitating means, there is charged 368 parts of the above prepared reaction product, together with 298 parts of an amide acrylate reaction prepared as generally described in Example III, 32 parts of a pentaerythritol tri- and tetra-acrylate blend ("Chemlink 41"; Ware Chemical), 8 parts of a polysiloxane urethane acrylate prepared as generally described according to Example IV, 2 parts of a fluorocarbon ("FC-430"; 3M Company) and 32 parts of a methacrylate terminated polysiloxane ("F-816"; SWS Silicone Corp.). The components are mixed to form a homogeneous blend, to which is then added 16 parts benzophenone and 32 parts α,α-dimethoxy-α-phenyl-acetophenone ("Irgacure 651"; Ciba-Geigy) with continued agitation of the mixture. Thereafter, the mixture is transferred to a Cowles mixing apparatus, with 12 parts of a fumed silicon dioxide pigment ("Cab-O-Sil"; Cabot Corp.) then being added to the mixture. Mixing proceeds until there is obtained a homogeneous blend with a particle dispersion of 6.5–7.0 on the Hegman scale.

Samples of the composition are applied by a glass rod applicator to substrates of the aforementioned type to a film depth of approximately 0.006 millimeter, with curing conditions as set forth in Example VI; pertinent data are listed in Table I.

EXAMPLE X

Into a reaction vessel equipped as in Example I, there is charged 150 parts formic acid together with 315 parts diethanolamine in 50 parts xylene. The mixture is agitated and heated to reflux conditions in accordance with conventional methods for about six hours, after which time about 616 parts water of reaction is collected. Volatile solvent is removed from the reaction product by conventional stripping methods.

Into another reaction vessel similarly equipped, there is charged 133 parts of the previously prepared reaction product, together with 144 parts acrylic acid, 0.004 part phenothiazine, 3 parts butylstannoic acid, 0.7 part thiodipropionic acid and 200 parts toluene. The mixture is agitated and refluxed at a reflux temperature of 103°–117° C. for about nine hours, after which time about 27.5 parts water of reaction is collected. The reaction product is then filtered and volatile solvent is removed in accordance with conventional methods, with an off-white liquid of low viscosity being obtained.

To a Cowles-type mixing apparatus, there is charged 65.3 parts of the previously prepared reaction product containing bis(acryloxyethyl) formamide, together with 5.6 parts talc ("Mistron RCS"; Cyprus Industrial Minerals), 27.5 parts aluminum silicate, 27.5 parts silica ("Imsil A-25"; Illinois Minerals) and 13.8 parts ground marble. Mixing proceeds until a homogeneous dispersion of the ingredients is obtained. Then 1.3 parts benzophenone is added to the reaction mixture, with mixing thereafter to accomplish a homogeneous composition. Samples of the composition are applied with a 1.5 mil Bird draw-down applicator onto panels of a particle board substrate. The coatings are cured in air under four 200 watt per inch mercury vapor lamps at a distance of 3½ inches from the panels at a conveyor speed of 100 feet per minute. A panel having a cured coating thereon was subjected to two sanding passes with a #220 grit sandpaper; no substantial gumming of the sandpaper was noted.

EXAMPLE XI

Into a reaction vessel equipped with heating and agitating means and a thermometer, there is charged 56.2 parts of amide acrylate reaction product prepared generally in accordance with Example V, together with 8.6 parts of a urethane diacrylate made conventionally from the reaction of 1.25 moles bis(4-isocyanatocyclohexyl) methane ("Hylene W"; DuPont), one mole of a polycaprolactone polyol having a molecular weight of 530 (PCP 0200; Union Carbide Corp.) and 0.5 mole of 2-hydroxyethyl acrylate, which urethane diacrylate reaction product is further diluted with 2-hydroxyethyl acrylate to achieve a final diluent concentration of 34 percent by weight. Also added to the reaction vessel are 5.5 parts neopentyl glycol diacrylate, 0.6 part polyethylene wax ("Polymist B-6"; Allied Chemical), 6.1 parts silica pigment ("Syloid 74-X4500"; W. R. Grace), 7.9 parts 2-ethylhexyl acrylate, 2.2 parts benzophenone and 12.8 parts N-vinylpyrrolidone. Mixing proceeds until a homogeneous blend is obtained having a grind of about 4.5 on the Hegman scale.

Samples of the composition are applied to panels of vinyl overlay and free vinyl films of 4 to 6 mil thickness by conventional draw-down methods. The coated panels are subjected to ultraviolet light exposure under a single 200 watt per inch lamp at a distance 3½ inches from the panels, with the panels being conveyed at a speed of 30 feet per minute. The cured coated panels exhibited good mar resistance and desirably lower gloss suitable for simulated wood products.

Listed below in Table I are data relating to cure rates and physical characteristics of the coating compositions applied to each of the test panels of Examples VI through IX.

TABLE I

| Sample Example # | Panel # | Conveyor Speed* (ft./min.) | Fingernail Mar Resistance | Gloss (at 60° inclination) | Flexibility |
|---|---|---|---|---|---|
| VI-A | 1 | 290 | Mars | — | — |
| | 2 | 280 | Very slight mar | — | — |
| | 3 | 270 | Mar-free | 88-91 | Excellent |
| VI-B | 1 | 270 | Mars | — | — |
| | 2 | 260 | Slight mar | — | — |
| | 3 | 250 | Very slight mar | — | — |
| | 4 | 240 | Mar-free to very slight mar | 88-91 | Excellent |
| VII | 1 | 175 | Mars | — | — |
| | 2 | 150 | Mar-free | 80 | Excellent |
| VIII | 1 | 271 | Mars | — | — |
| | 2 | 258 | Mar-free | 93-95 | Excellent |
| IX | 1 | 275 | Very slight mar | — | — |
| | 2 | 255 | Mar-free | 70-80 | Excellent |

*Exposure = one 200 watt/inch Hg vapor lamp

According to the provisions of the Patent Statutes, there are described above the invention and what are now considered to be its best embodiments. However, within the scope of the appended claims, it is to be understood that the invention can be practiced otherwise than as specifically described.

We claim:

1. Radiation polymerizable, highly radiation-sensitive composition curable to form a film comprising from about one to 99 percent by weight of one or more amide acrylate compounds having one nitrogen atom and being of the formula:

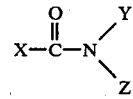

wherein X, Y and Z may each independently be H, alkyl, aryl, acrylyloxyalkyl, acrylyloxy aliphatic ester formed by reaction of acrylating material with hydroxyl terminated aliphatic ester-containing intermediate resulting from the reaction of inner ester of hydroxy carboxylic acid and amino alcohol, or acrylyloxy aliphatic ether, provided that X, Y and Z together have two, three of four acrylyloxy groups.

2. The composition of claim 1 wherein
X is hydrogen,
Y and Z are each

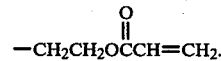

3. The composition of claim 1 wherein
X is

Y and Z are each

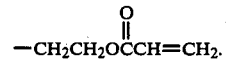

4. The composition of claim 1 wherein
X is

Y and Z are each

5. The composition of claim 1 wherein X is

Y and Z are each

6. The composition of claim 1 wherein X is

Y and Z are each

7. The composition of claim 1 wherein X is

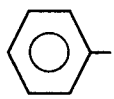

Y and Z are each

8. The composition of claim 1 wherein X is

Y and Z are each

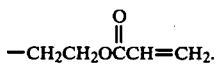

9. The composition of claim 1 wherein X is

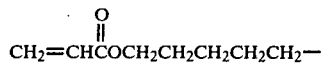

Y is —CH$_3$
Z is

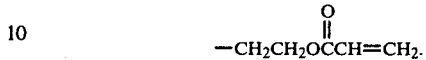

10. The composition of claim 1 wherein X is

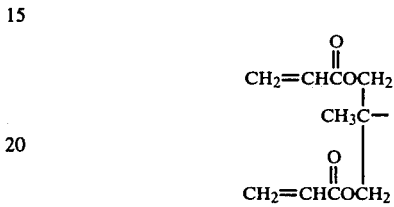

Y and Z are each

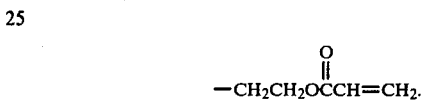

11. The composition of claim 1 comprising esterified or partially esterified reaction product of a lower alkyl polyhydric alcohol or an alkyl or aryl polyfunctional epoxide and acrylic acid or methacrylic acid.

12. The composition of claim 11 wherein said lower alkyl polyhydric alcohol is selected from the group consisting of diethylene glycol, triethylene glycol, propylene glycol, dipropylene glycol, hexane diol, glycerol, neopentyl glycol, pentaerythritol, trimethylolethane, trimethylolpropane and 2,2-dimethyl-3-hydroxypropyl 2,2-dimethyl-3-hydroxypropionate.

13. The composition of claim 11 wherein said alkyl or aryl polyfunctional epoxide is selected from the group consisting of butane diol diglycidyl ether, neopentyl glycol diglycidyl ether, diethylene glycol diglycidyl ether, polyethylene glycol diglycidyl ether and bisphenol A diglycidyl ether.

14. The composition of claim 1 comprising a reactive compound copolymerizable with said amide acrylate compound selected from the group consisting of styrenes, vinyl amides, esters of vinyl alcohols, acrylate esters, maleate esters and fumarate esters.

15. The composition of claim 1 comprising a substantially non-reactive solvent selected from the group consisting of xylene, toluene, 2-methoxyethanol, methyl isobutyl ketone and isopropyl alcohol.

16. The composition of claim 1 comprising a viscosity modifying agent selected from the group consisting of cellulose acetate butyrate, carboxymethyl cellulose, microcrystalline cellulose, fumed silica, castor oil based compositions, 12-hydroxystearic acid, alkyd polymers, acrylic polymers, and modified clays.

17. The composition of claim 1 comprising a surface tension reducing agent selected from the group consisting of branched lower alkyl acrylate polymers, fluorocarbon polymers and non-ionic alkyl ester surfactants, ethoxylated alkyl ester surfactants and ethoxylated phenol surfactants.

18. The composition of claim 17 wherein said branched lower alkyl acrylate polymer is poly(2-ethylhexylacrylate).

19. The composition of claim 1 comprising a slip-aid agent selected from the group consisting of polysiloxanes, fatty acids, fatty acid esters and waxes comprised of esters of long chain monohydric alcohols and long chain fatty acids.

20. The composition of claim 19 wherein said wax comprises a mixture of cetyl palmitate and related fatty acid esters.

21. The composition of claim 20 wherein said wax is spermaceti wax.

22. The composition of claim 1 comprising a photocatalyst system comprising one or more of a photosensitizer, a photopromoter or a photoinitiator, said photocatalyst system being present in an amount in the range of about 0.01 to about 20 percent by weight of polymerizable compound in said composition.

23. The composition of claim 22 wherein said photosensitizer is selected from the group consisting of benzil, anthraquinone, benzophenone, 3-methoxybenzophenone, anthrone, thioxanthone and chlorothioxanthone.

24. The composition of claim 22 wherein said photopromoter is selected from the group consisting of tertiary alkyl amines, tertiary alkanol amines and diamines.

25. The composition of claim 22 wherein said photoinitiator is selected from the group consisting of benzoin, methyl benzoin ether, butyl benzoin ether, isobutyl benzoin ether, α,α-diethoxyacetophenone, α,α-dimethoxy-α-phenyl-acetophenone, α-chloroacetophenone and methyl phenylglyoxylate.

26. The composition of claim 3 wherein
(a) said prepolymer moiety is selected from the group consisting of a polyester polyol, a polyether polyol and a poly(hydrocarbyl siloxane) containing hydroxy functional groups pendent to the siloxane backbone;
(b) said isocyanato-containing compound is selected from the group consisting of aliphatic polyisocyanates and aromatic polyisocyanates; and
(c) said polyfunctional compound is acrylic acid or a hydroxyl-containing acrylic ester.

27. The composition of claim 1 comprising extender or hiding pigment.

28. Radiation polymerizable, highly radiation-sensitive composition curable to form a film comprising from about one to 99 percent by weight of amide acrylate compound of the formula:

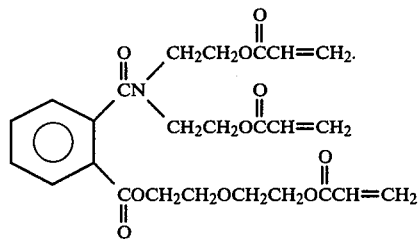

29. Radiation polymerizable, highly radiation-sensitive composition curable to form a film comprising from about one to 99 percent by weight of amide acrylate compound of the formula:

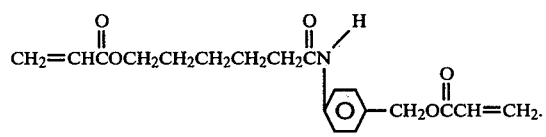

30. Radiation polymerizable, highly radiation-sensitive composition curable to form a film comprising (A) from about one to 99 percent by weight of one or more amide acrylate compounds having one nitrogen atom and being of the formula:

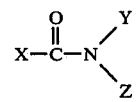

wherein X, Y and Z may each independently be H, alkyl, aryl, acrylyloxyalkyl, acrylyloxy aliphatic ester formed by reaction of acrylating material with hydroxyl terminated aliphatic ester-containing intermediate resulting from the reaction of inner ester of hydroxy carboxylic acid and amino alcohol, or acrylyloxy aliphatic ether, provided that X, Y and X together have two, three or four acrylyloxy groups; and (B) a urethane acrylate co-curing agent derived from the stepwise reaction of:
(a) a prepolymer moiety of molecular weight 300 to 3,000 having a plurality of hydroxyl functional groups,
(b) a compound having a plurality of isocyanato groups, a portion of said isocyanato groups reactive with said prepolymer moiety hydroxyl functional groups, and
(c) a polyfunctional compound containing at least one functional group which is reactive with an isocyanato group and which polyfunctional compound after reaction with said isocyanato group provides at least one ethylenic functional group in said reaction product.

* * * * *